(12) United States Patent
Bangalore Krishnamurthy

(10) Patent No.: US 11,296,978 B2
(45) Date of Patent: **\*Apr. 5, 2022**

(54) ENABLEMENT OF MULTI-PATH ROUTING IN VIRTUAL EDGE SYSTEMS

(71) Applicant: Nicira, Inc., Palo Alto, CA (US)

(72) Inventor: Sudheendra Bangalore Krishnamurthy, Bangalore (IN)

(73) Assignee: Nicira, Inc., Palo Alto, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 16/890,238

(22) Filed: Jun. 2, 2020

(65) Prior Publication Data

US 2020/0296027 A1    Sep. 17, 2020

Related U.S. Application Data

(63) Continuation of application No. 15/412,075, filed on Jan. 23, 2017, now Pat. No. 10,700,960.

(30) Foreign Application Priority Data

Nov. 17, 2016   (IN) .............................. 201641039234

(51) Int. Cl.
| | | |
|---|---|---|
| *G06F 15/173* | (2006.01) | |
| *H04L 45/24* | (2022.01) | |
| *H04L 12/46* | (2006.01) | |
| *H04L 45/021* | (2022.01) | |
| *H04L 47/22* | (2022.01) | |
| *H04L 67/142* | (2022.01) | |
| *H04L 69/16* | (2022.01) | |

(52) U.S. Cl.
CPC .......... *H04L 45/24* (2013.01); *H04L 12/4641* (2013.01); *H04L 45/021* (2013.01); *H04L 47/22* (2013.01); *H04L 67/142* (2013.01); *H04L 69/16* (2013.01)

(58) Field of Classification Search
CPC ... H04L 45/64; H04L 47/125; H04L 67/1008; H04L 12/4641; H04L 45/24; H04L 45/22; H04L 45/38; H04L 67/1029
See application file for complete search history.

(56) References Cited

U.S. PATENT DOCUMENTS

| | | | |
|---|---|---|---|
| 8,706,865 B1 * | 4/2014 | L'Heureux ........... | H04L 67/101 709/224 |
| 8,984,635 B1 * | 3/2015 | Graham-Cumming ...................... | H04L 9/3239 726/23 |

(Continued)

*Primary Examiner* — Oleg Survillo

(57) ABSTRACT

The technology disclosed herein enables multi-path routing in virtual edge systems of a virtual network environment. In a particular embodiment, a method provides establishing a connection for a communication with a client outside of the virtual network environment through a first virtual edge system of a plurality of virtual edge systems. The method further provides generating state information about the connection that indicates properties of the connection with respect to the first virtual edge system and updating a state information base of the first virtual edge system with the state information. Also, the method provides transferring the state information to one or more other virtual edge systems of the plurality of virtual edge systems and updating respective state information bases of the one or more other virtual edge systems with the state information.

20 Claims, 7 Drawing Sheets

(56) References Cited

U.S. PATENT DOCUMENTS

| | | | |
|---|---|---|---|
| 2005/0055435 A1* | 3/2005 | Gbadegesin | H04L 67/1008 709/224 |
| 2005/0132044 A1* | 6/2005 | Guingo | H04L 43/026 709/225 |
| 2005/0261985 A1* | 11/2005 | Miller | G06Q 10/06 709/223 |
| 2008/0183854 A1* | 7/2008 | Hopen | H04L 41/12 709/223 |
| 2008/0240121 A1* | 10/2008 | Xiong | H04L 45/24 370/401 |
| 2010/0061227 A1* | 3/2010 | Sundt | H04L 45/28 370/221 |
| 2010/0061381 A1* | 3/2010 | Sundt | H04L 45/24 370/400 |
| 2011/0019590 A1* | 1/2011 | Rao | H04L 49/15 370/255 |
| 2011/0238816 A1* | 9/2011 | Vohra | H04L 41/0806 709/224 |
| 2012/0155266 A1* | 6/2012 | Patel | H04L 47/125 370/235 |
| 2014/0280969 A1* | 9/2014 | Wood | H04L 47/125 709/226 |
| 2014/0325080 A1* | 10/2014 | Mukesh | H04L 67/1027 709/228 |
| 2016/0105471 A1* | 4/2016 | Nunes | H04L 45/64 709/228 |
| 2016/0119229 A1* | 4/2016 | Zhou | H04L 12/4641 370/392 |
| 2016/0134527 A1* | 5/2016 | Kwak | H04L 45/04 370/352 |
| 2017/0093723 A1* | 3/2017 | Sane | H04L 67/1008 |
| 2017/0257464 A1* | 9/2017 | Mapes | H04L 67/2823 |
| 2018/0227224 A1* | 8/2018 | Bhaskar | H04L 45/745 |
| 2018/0331965 A1* | 11/2018 | Tandel | H04L 47/20 |

* cited by examiner

ENABLEMENT OF MULTI-PATH ROUTING IN VIRTUAL EDGE SYSTEMS

RELATED APPLICATIONS

This application is a continuation of, and claims priority to, U.S. patent application Ser. No. 15/412,075, entitled "ENABLEMENT OF MULTI-PATH ROUTING IN VIRTUAL EDGE SYSTEMS," filed Jan. 23, 2017, which claimed the benefit under 35 U.S.C. 119(a)-(d) to Foreign Application Serial No. 201641039234 filed in India entitled "ENABLEMENT OF MULTI-PATH ROUTING IN VIRTUAL EDGE SYSTEMS", filed on Nov. 17, 2016, by Nicira, Inc., all of which are hereby incorporated by reference in their entirety for all purposes.

TECHNICAL BACKGROUND

In item movement situations, adding paths over which items can be moved will typically increase the throughput of those items. This is as true physical items, such additional highway lanes for vehicles to use, as it is for data packets traversing a network. While a single network path may be limited to a given packet rate, whether that rate is caused by hardware limitations or congestion, that packet rate can be increased by providing additional network paths over which packets can be transferred. Modern networking protocols even allow data packets that are part of the same packet stream to be transferred over different network paths. A system at the receiving end of those packets is able to reassemble the packet stream properly even though the packets transferred over different paths may not be received in order.

However, in some network arrangements, intermediate network elements between a source and a destination of data packets may be configured to perform functions beyond simply routing the packets to a next hop in the network path. Some of these functions may include stateful functions, such as a firewall function, that rely on connection state information (e.g., network addresses, port identifiers, etc.) when operating on packets. Accordingly, an intermediate system that performs stateful functions can cause a bottle neck for packets in a multi-path routing situation by virtue of the intermediate system requiring the aforementioned state information.

The bottleneck situation above is as much an issue for virtualized intermediate systems as it is for physical intermediate systems. For example, many enterprise networks, or networks having similar architectures, use edge systems to regulate traffic going into and coming out of the network. Virtualizing these edge systems using virtual machines, containers, or some other type of virtualized computing element, allows multiple edge systems to be instantiated on one or more physical host systems. However, even if multiple virtual edge systems are instantiated on the same host system, the state information used by each respective virtual edge systems remains independent just as though those virtual edge systems were distinct physical elements. Thus, even when using virtual edge systems to perform stateful functions on network traffic, the multi-path bottleneck remains.

Overview

The technology disclosed herein enables multi-path routing in virtual edge systems of a virtual network environment. In a particular embodiment, a method provides establishing a connection for a communication with a client outside of the virtual network environment through a first virtual edge system of a plurality of virtual edge systems. The method further provides generating state information about the connection that indicates properties of the connection with respect to the first virtual edge system and updating a state information base of the first virtual edge system with the state information. Also, the method provides transferring the state information to one or more other virtual edge systems of the plurality of virtual edge systems and updating respective state information bases of the one or more other virtual edge systems with the state information.

In some embodiments, the method provides handling traffic directed to the client for the communication through the one or more other virtual edge systems based on the state information in the same manner as the first virtual edge system would. In these embodiments, a virtual router may direct the traffic from a virtual application server to the first virtual edge system and the one or more other virtual edge systems for handling.

In some embodiments, the method provides using the state information to initiate a handshake between each of the one or more other virtual edge systems and the client to establish respective connections with the client through each of the one or more other virtual edge systems and routing traffic for the communication through the one or more other virtual edge systems to the client over the respective connections.

In some embodiments, the connection comprises a Transmission Control Protocol (TCP) connection. In these embodiments, establishing the TCP connection may comprise, in the first virtual edge system receiving a TCP synchronize (SYN) message from the client that indicates a source port and a destination port, wherein the source port and the destination port are included in the state information, responding to the TCP SYN message with a TCP SYN-acknowledge (ACK) message, and receiving a TCP ACK message from the client in response to the TCP SYN-ACK message.

In some embodiments, transferring the state information comprises transferring the state information to a controller of the plurality of virtual edge systems and, in the controller, identifying the one or more virtual edge systems from the plurality of virtual edge systems as virtual edge systems configured for multi-path routing and transferring the state information from the controller to the one or more other virtual edge systems. In these embodiments, the controller comprises a virtual machine separate from the plurality of virtual edge systems.

In some embodiments, the state information is transferred over a control plane channel employed by the controller and the plurality of virtual edge devices.

In some embodiments, the first virtual edge system and the one or more other virtual edge systems include respective firewalls that identify traffic for the communication from the state information and allow the traffic to pass.

In another embodiment, a system hosting a first virtual edge system is provided. The system includes one or more computer readable storage media and a processing system operatively coupled with the one or more computer readable storage media. Program instructions stored on the one or more computer readable storage media, when read and executed by the processing system, direct the processing system to establish a connection for a communication with a client outside of the virtual network environment through the first virtual edge system of a plurality of virtual edge systems. The program instructions further direct the processing system to generate state information about the connection that indicates properties of the connection with respect to the first virtual edge system and update a state information base of the first virtual edge system with the state information. Also, the program instructions direct the processing system to transfer the state information to one or more other virtual edge systems of the plurality of virtual edge systems, wherein the one or more virtual edge systems update their respective state information bases with the state information.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

Figure 1:
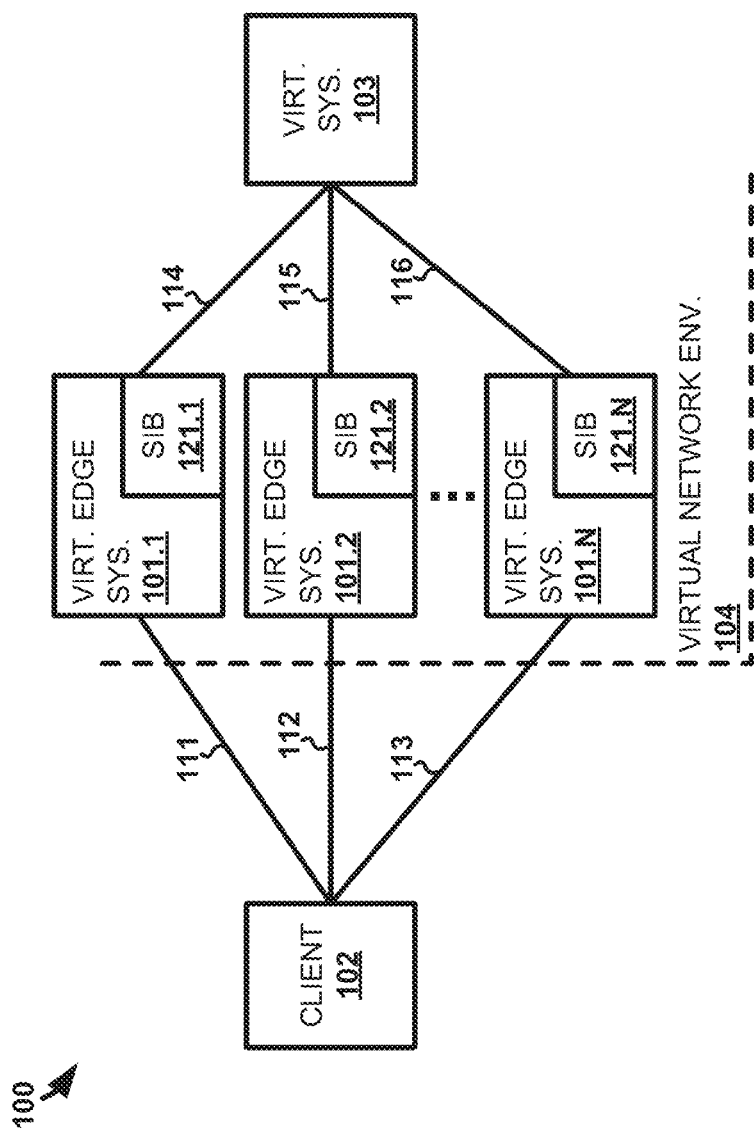
FIG. 1 illustrates a computing environment to enable multi-path routing in virtual edge systems.

FIG. 1 illustrates computing environment 100 for enabling multi-path routing in virtual edge systems. Computing environment 100 includes virtual edge systems 101.1-N, client system 102, and virtual destination system 103. Virtual edge systems 101.1-N and virtual destination system 103 are virtual elements included in virtual network environment 104. The virtual elements of virtual environment 104 are implemented on physical host computing systems through the execution of a hypervisor, or some other software element having similar functionality, thereon. Virtual edges systems 101.1-N are expressed as such since the multi-path routing described herein can be performed using any number of two or more virtual edge systems. Similarly, while only one destination system 103 is shown, any number of systems of serving various purposes may be located within virtual network environment 104. Communication links 111-116 may include some combination of virtual and physical communication links depending on how the virtual elements of virtual network environment 104 are arranged on physical host computing systems.

In operation, all communication traffic going into or out of virtual network environment 104 must pass through one of virtual edge systems 101.1-N. Virtual edge systems 101.1-N are therefore able to process the communication traffic entering and exiting virtual network environment 104. The processing may allow virtual edge systems 101.1-N to handle traffic in more robust ways than simply passing the traffic through. For instance, edge systems 101.1-N include respective state information bases 121.1-N. State information bases 121.1-N store state information relevant to each virtual edges system's handling of communication traffic. Specifically, the state information is used for stateful services provided by virtual edge systems 101.1-N (i.e., services that rely on previously gathered or created information to know how traffic should be handled). A common example of a stateful service is a firewall service that allows traffic to pass or denies that traffic based on information in a state information base (e.g., the state information base may indicate network addresses to or from which traffic should be blocked or allowed to pass). With each state information base 121.1-N being independent of one another, each virtual edge system 101.1-N may behave differently when providing stateful services based on the state information included in their respective state information base. Using a firewall service as an example, communication traffic that may be allowed to pass through one virtual edge system based on that system's state information base may not be allowed to pass through another virtual edges system based on that system's state information base. Thus, routing communications through multiple virtual edge systems to implement multi-path routing may be thwarted due to differing state information bases.

Figure 2:
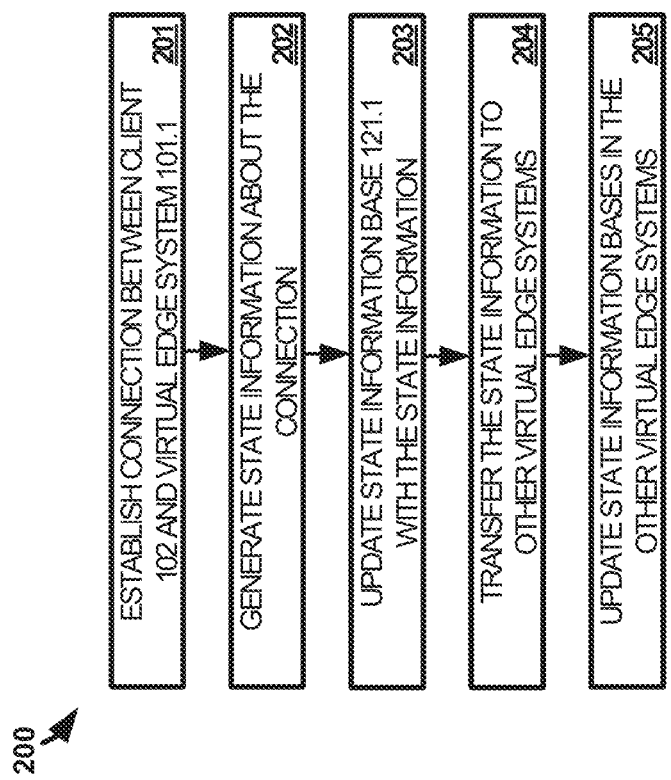
FIG. 2 illustrates a method of operating the computing environment to enable multi-path routing in virtual edge systems.

FIG. 2 illustrates method 200 of operating computing environment 100 to enable multi-path routing in virtual edge systems. Method 200 provides establishing a connection for a communication with client system 102 through one of virtual edge systems 101.1-N (201). Client system 102 is located outside of virtual network environment 104 and, in this example, is attempting to access virtual destination system 103 through virtual edge system 101.1. In some cases, client system 102 may connect with virtual edge system 101.1 over the Internet, although other types of networks may also be involved. The connection establishment may comprise the three-step handshake defined by the Transmission Control Protocol (TCP) of the Internet Protocol (IP) suite of protocols. However, other networking protocols and/or other manners of connection establishment may also be used.

Method 200 further provides generating state information about the connection that indicates properties of the connection with respect to virtual edge system 101.1 (202). The state information includes any type of information that may be used by a virtual edge system when determining how to route communications. For example, the state information may include a source port (i.e., a port of client system 102), a destination port (i.e., a port of virtual edge system 101.1), a network address of client system 102, a network address of virtual edge system 101.1, a network address of virtual destination system 103, or some other type of information describing the connection.

After generating the state information, method 200 provides updating state information base 121.1 of virtual edge system 101.1 with the generated state information (203). State information base 121.1 along with the other state information bases 121.2-N may comprise any type of data structure (e.g., table, linked list, etc.) that can be accessed by its respective virtual edge system 101.1-N. When adding the state information to state information base 121.1, the state information may be ordered (e.g., indexed) within state information base 121.1 such that it can more readily be found by virtual edge system 101.1 when accessing state information base 121.1. In addition to updating state information base 121.1 with the state information, method 200 provides transferring the state information to one or more of the other virtual edge systems 121.2-N (204). That is, the state information may be transferred to all of the other virtual edge systems or some subset of the other virtual edge systems. A determination as to which virtual edge systems the state information is transferred may be made by virtual edge system 101.1, by a virtual system that controls virtual edge systems 101.1-N, or by some other system. The determination may be made based on the number of paths desired for multi-path routing (with one virtual edge system for each path), based on the communication load being handled by each virtual edge system (e.g., the state information may not be transferred to communication systems already under heavy load), based on the arrangement of virtual edge systems 101.1-N on host computing systems, or based on some other factor. The state information may be transferred directly from virtual edge system 101.1 to the other virtual edge systems or may be transferred to another system (e.g., a virtual system that controls virtual edge systems 101.1-N) before being passed on to the other virtual edge systems.

Once the state information is received by the other ones of virtual edge systems 101.2-N, method 200 provides updating respective state information bases 121.2-N of those respective other virtual edge systems with the state information (205). State information bases 121.2-N are updated in the same manner that virtual edge system 101.1 used to update state information base 121.1. After the respective ones of state information bases 121.2-N are updated to include the state information, the respective ones of the other virtual edge systems 101.2-N are aware of the connection with client system 102 in the same way virtual edge system 101.1 is aware of the connection and can route communications for the connection with client system 102 in the same manner. For example, if virtual edge system 102.2 is one of the virtual edge systems that received the state information and updated state information base 121.2 accordingly, then virtual edge system will route communication traffic directed to client system 102 (e.g., traffic from virtual destination system 103) in the same manner as the traffic would be routed by virtual edge system 101.1. As such, multi-path routing for the connection with client system 102 can be enabled through all virtual edge systems 101.1-N that have updated their state information bases with the state information.

Referring back to FIG. 1, virtual edge systems 101.1-N comprise network edge systems implemented as virtual machines, containers, or some other type of virtualized computing element, executing on one or more host computing systems. Virtual destination system 103 similarly executes as a virtualized computing element on a host computing system that may or may not be a host computing system that is also executing one or more of virtual edge systems 101.1-N. The host computing systems include processing circuitry and network communication interfaces. The host computing systems may further include other components such as a user interface, router, server, data storage system, and power supply.

Client system 102 also comprises processing circuitry and a computing interface. Client system 102 may further include other components such as a user interface, router, server, data storage system, and power supply. Client system 102 may reside in a single device or may be distributed across multiple devices. Client system 102 may be a user device, such as a personal computer, telephone, tablet, etc., or may be some other type of computing system. In some examples, client system 102 may be implemented as a virtual machine executing on a host computing system similar to those described above. Although, in those examples, client system 102 would still be considered to be external to virtual network environment 104.

Figure 3:
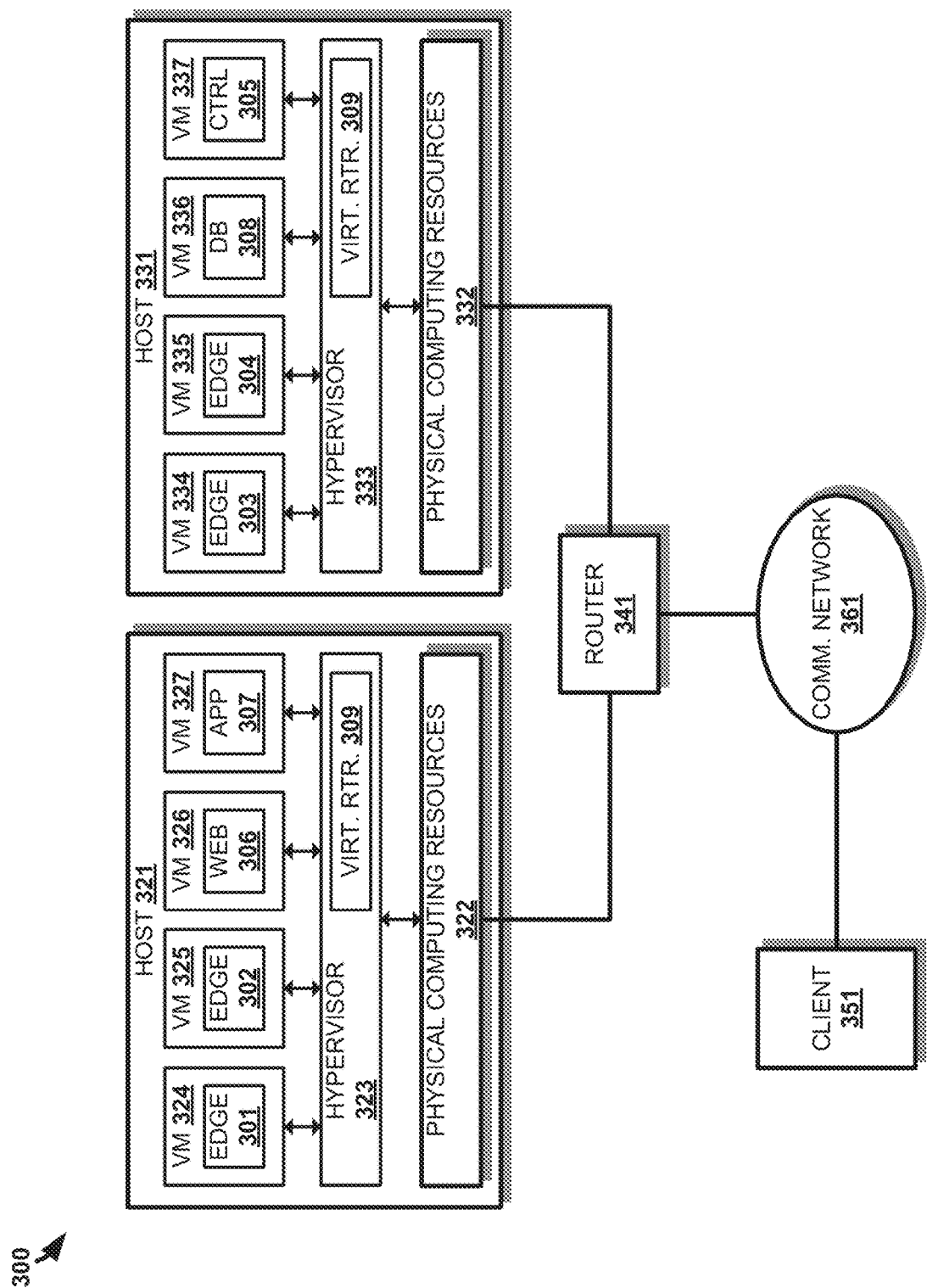
FIG. 3 illustrates another computing environment to enable multi-path routing in virtual edge systems.

FIG. 3 illustrates computing environment 300 for enabling multi-path routing in virtual edge systems. Computing environment 300 includes host computing system 321, host computing system 331, communications router 341, communication network 361, and client system 351. In this example, communications router 341 comprises a layer 3 (network layer) router in the Open Systems Interconnection model (OSI model) that routes communications to/from and between host computing systems 321 and 331. Communication router 341 is further configured to exchange communications with other systems and devices over communication network 361. Communication network 361 may include the Internet, one or more local area networks, and/or one or more wide area networks. While shown separately, communication router 341 may be considered part of communication network 361 in some examples. Client 351 is able to communicate with host computing systems 321 and 331 via communication network 361 and communication router 341.

In this example, host computing system 321 executes hypervisor 323 to allocate physical computing resources 322 among virtual machines 324-327. Likewise, host computing system 331 executes hypervisor 333 to allocate physical computing resources 332 among virtual machines 334-337. Physical computing resources 322 and 332 may include processing resources (e.g., CPU time/cores), memory space, network interfaces, user interfaces, or any other type of resource that a physical computing system may include. Each of virtual machines 324-327 and 334-337 include a virtual element that makes up a virtual environment. Those components include virtual edge systems 301-304, edge system controller 305, and a three-tiered application system comprising a web tier system 306, an application tier system 307, and a database tier system 308. It is that three-tiered application that client 351 will attempt to access in the examples below. An instance of a virtual router 309 is implemented in each of hypervisors 323 and 333. Virtual router 309 may comprise a distributed logical router (DLR) or may comprise some other component for routing communications between virtual machines, which could be implemented on a common host computing system.

It should be understood that the distribution of virtual machines even across two host computing systems, as shown in FIG. 3, is merely exemplary. The eight virtual machines shown may instead be implemented on any number of host computing systems from one to eight. Likewise, the host computing systems 321 and 331 could host additional virtual machines that are not involved in this example.

Figure 4:
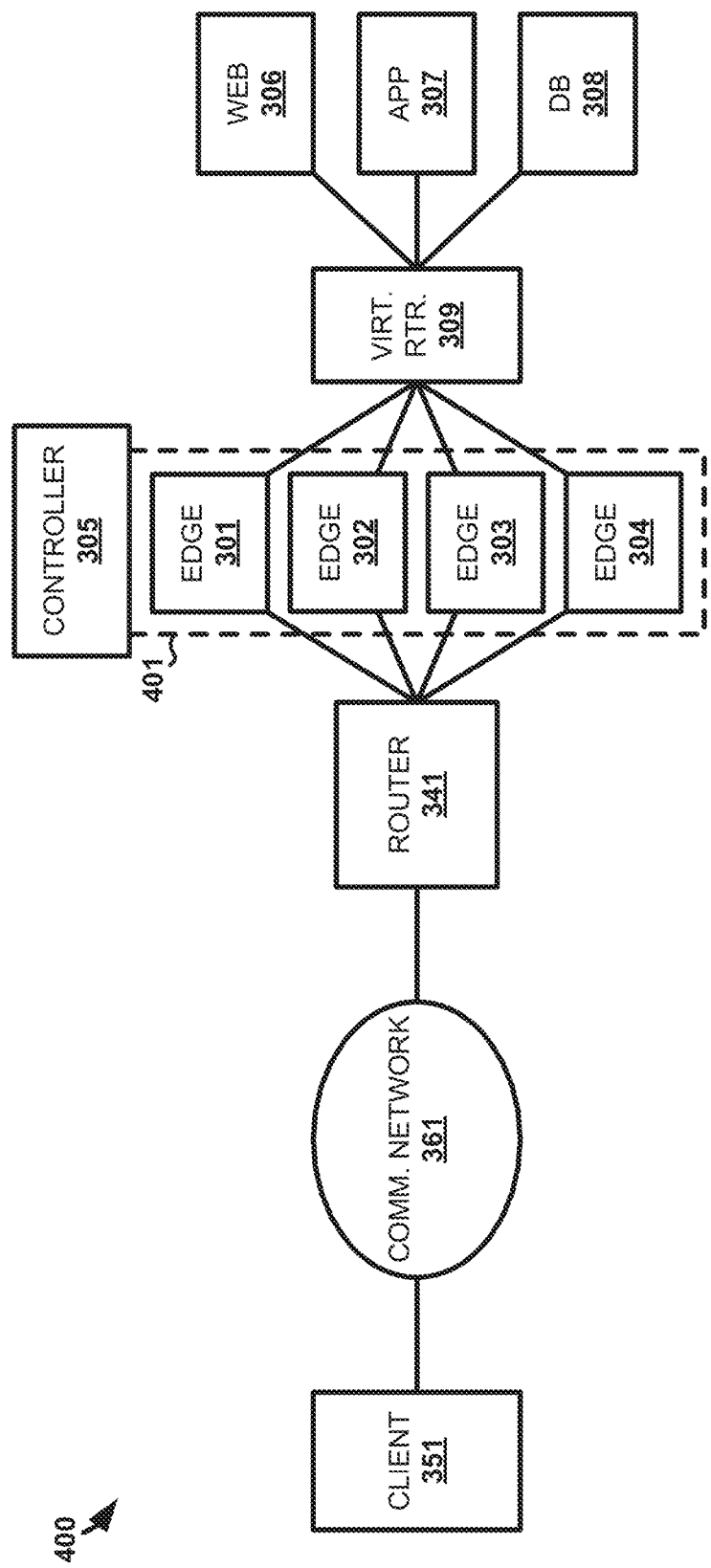
FIG. 4 illustrates a logical arrangement of the computing environment to enable multi-path routing in virtual edge systems.

FIG. 4 illustrates logical arrangement 400 of computing environment 300 to enable multi-path routing in virtual edge systems. Specifically, logical arrangement 400 illustrates a network topology of virtual elements 301-308 as though virtual elements 301-308 were physical computing elements networked together. Because, as is the nature of virtual machines, the virtual elements 301-308 operate as though they are executing directly on physical computing systems with hypervisors 322 and 332 emulating computing resources which allows virtual elements 301-308 to do so.

Edge system controller 305 creates a control plane 401 through which virtual edge systems 301-304 can be controlled without edge system controller 305 being in a data communication path.

Virtual router 309 is shown as a router handling data communication traffic between virtual edge systems 301 and three-tiered application systems 306-308. Communications exchanged between elements 301-304 and 306-307 are handled by virtual router 309. For example, since virtual edge system 302 and web tier system 306 are located on the same host computing system 321, virtual router 309 handles the "routing" of network communications between the two over virtual communication links while the communications remain within host computing system 321. In other examples where the two systems are located on different host computing systems, virtual router 309 handles the transfer of those communications over physical network links between the host computing systems since instances of virtual router 309 are included in both of hypervisors 322 and 332 to effectively create a single router.

Figure 5:
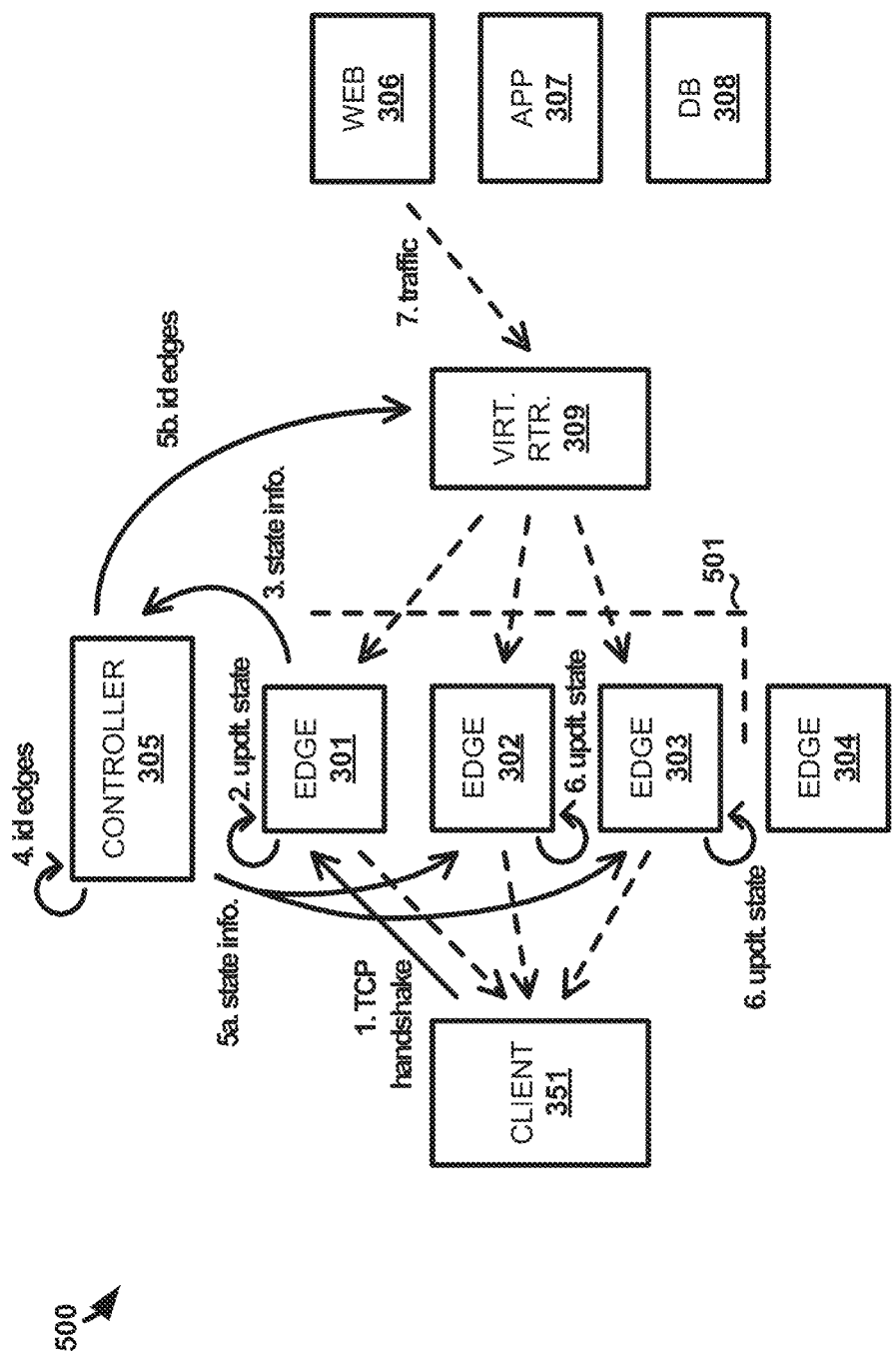
FIG. 5 illustrates an operational scenario of the other computing environment to enable multi-path routing in virtual edge systems according to one implementation.

FIG. 5 illustrates an operational scenario 500 of computing environment 300 to enable multi-path routing in virtual edge systems in an example implementation. Communication network 361 and communications router 341 are omitted from scenario 500 as their functionality remains consistent with that typically found in the art. Accordingly, it should be understood that communications between client system 351 and any of virtual edge systems 301-304 pass through communication network 361 and communication router 341. In some examples, communication router 341 may include logic to determine which virtual edge system 301-304 should receive initial communications from a client system located outside of the virtual environment. For instance, the logic may include load balancing logic or may determine a virtual edge system in some other manner.

Client system 351 comprises a user system executing a web browser application. In this case, a user of client system 351 directs client system 351, via the web browser, to access a web application provided by three-tiered application elements 306-308. Web tier system 306 is the specific system that will exchange communications with client system 351 to provide client system 351 with the web application. Web tier system 306, application tier system 307, and database tier system 308 communicate with one another so that web tier system 306 can provide the web application. When client system 351 initially reaches out to web tier system 306, the communications from client system 351 are routed into the virtual environment through virtual edge system 301. As noted above, router 341 or some other not-shown element may determine which of virtual edge systems 301-304 the initial communications from client system 351 are routed.

At step 1 of operational scenario 500, the initial communications with virtual edge system 301 comprise messages that perform a TCP handshake between client system 351 and virtual edge system 301. An example of a three-way TCP handshake that may be performed in this instance can be found in FIG. 6 below. Once the TCP handshake has completed, at step 2 virtual edge system 301 generates state information about the TCP connection that has been established with client system 351 and updates virtual edge system 301's stat information base with that state information. The information includes any information necessary for virtual edge system 301 to identify packet communications being exchanged with client system 351 through virtual edge system 301, such as port information, IP addresses, and the like. Any stateful function that is performed by virtual edge system 301 then uses the state information in the state information base to identify communications exchanged between web tier system 306 and client system 351 and handle them accordingly. For example, a firewall function of virtual edge system 301 may use the state information to identify communications exchanged with client system 351 and allow those communications to pass through virtual edge system 301.

To enable multi-path routing for communications transferred to client system 351, virtual edge system 301 transfers the state information generated above to edge system controller 305 at step 3. Upon receiving the state information, at step 4 edge system controller 305 identifies which of virtual edge systems 302-304 should be used for multi-path routing of communications to client system 351. In some cases, edge system controller 305 may identify all of the other virtual edge systems while, in other cases, only a subset of the other virtual edge systems is identified. This example results in edge system controller 305 identifying virtual edge systems 302 and 303. Virtual edge system 304 may be excluded due to virtual edge system 304 being overloaded, being incompatible with multi-path routing, or for some other reason.

At step 5a, edge system controller 305 transfers the state information to virtual edge systems 302 and 303 over control plane 401. When transferring the state information, edge system controller 305 may further include instructions on what each virtual edge system should do with the state information or virtual edge systems 302 and 303 may be preconfigured to handle state information received form edge system controller 305 (i.e., preconfigured to update their respective state information bases with received state information for multi-path routing). At substantially the same time, edge system controller 305 notifies virtual router 309 that multi-path routing is enabled in virtual edge systems 301. That notification may further provide the state information to virtual router 309 so that virtual router 309 can identify which packets are subject to the multi-path routing (i.e., packets for the connection with client system 351). Although, virtual router 309 may identify those packets in some other manner.

Additionally, at step 5b, edge system controller 305 informs virtual router 309 about the edge systems that were identified to receive the state information and also may receive the state information itself or some other information necessary for virtual router 309 to identify traffic intended for the connection with client system 351. Edge system controller 305 may communicate directly with virtual router 309 to convey the state information or may communicate through some other element, such as a virtual machine implemented to control virtual router 309 or some other element within hypervisors 323 and/or 333. Regardless of how virtual router 309 is informed, after step 5b, virtual router 309 knows that it can route traffic for the connection with client system 351 through any one of virtual edge systems 301-303.

Upon receiving the state information, at step 6 virtual edge systems 302 and 303 both update their respective state information bases with the state information. Accordingly, after updating, the state information bases of virtual edge systems 301, 302, and 303 all contain the same state information about the connection that client system 351 established with virtual edge system 301. Thus, as far as virtual edge systems 302 and 303 are concerned, the connection could have been originally established with them instead.

The sharing of state information for the connection with client system 351 effectively creates a common data plane, data plane 501, for each of virtual edge systems 301-303. Sharing data plane 501 allows data sent through any system of data plane 501 to handle that data in the same way. Thus, when web tier system 306 transfers data packets to client system 351 to provide client system 351 with the web application requested by client system 351, those data packets can be routed by virtual router 309 to any of virtual edge systems 301-303. Three paths between web tier system 306 and client system 351 are therefore available in a multi-path routing scheme. In this example, an equal cost multi-path (ECMP) routing scheme may be used by virtual router 309 to distribute communications among virtual edge systems 301-303, although, other routing schemes may be used instead. In ECMP, multiple next-hop addresses for the same destination are provided in a routing table and each next-hop address provides a route with equal cost to that of routes provided by the other addresses. The addresses of virtual edge systems 301-303 would be the next-hop addresses used for ECMP in this example.

Figure 6:
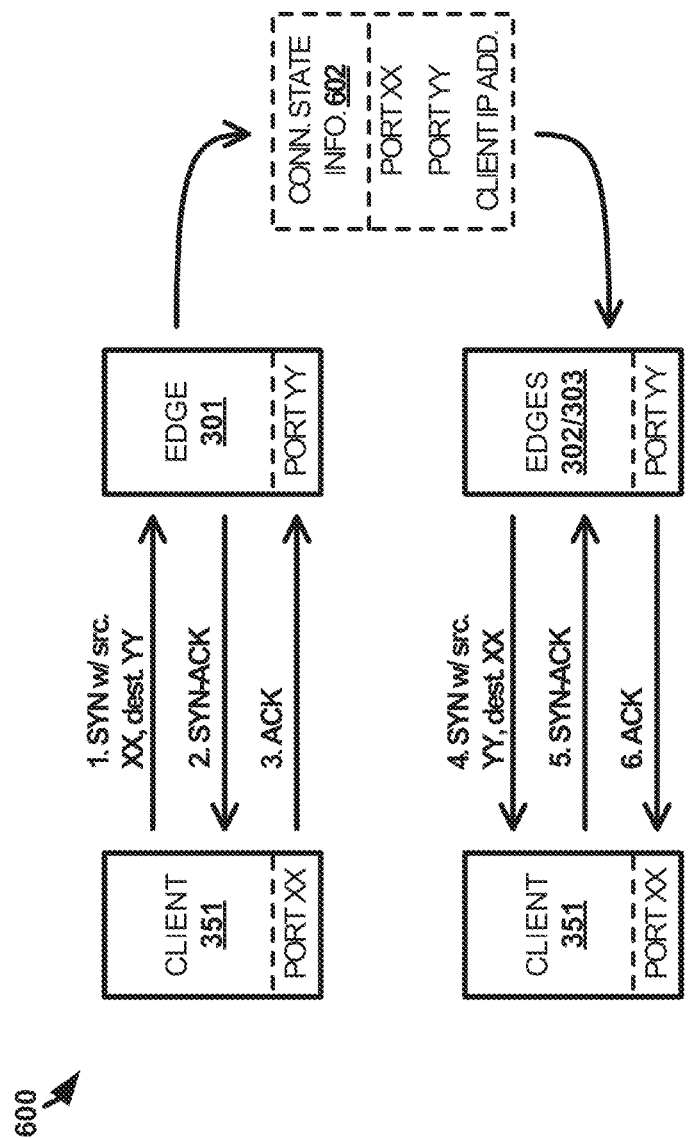
FIG. 6 illustrates another operational scenario of the other computing environment to enable multi-path routing in virtual edge systems according to one implementation.

FIG. 6 illustrates an operational scenario 600 of computing environment 300 to enable multi-path routing in virtual edge systems in another example implementation. Operational scenario 600 focuses on messages exchanged between virtual edge systems 301-303 and client system 351. Steps 1-3 of scenario 600 provide an example of the TCP handshake performed in step 1 of scenario 500. In particular, to initiate a TCP handshake, client system 351 in scenario 600 transfers a TCP SYN message to virtual edge system 301 at step 1. The TCP SYN message includes source port XX (i.e., the TCP communication port at client system 351) and destination port YY (i.e., the TCP communication port at virtual edge system 301). Other information may further be gleaned from the TCP SYN message, such as the IP address of client system 351. Virtual edge system 301 then acknowledges receipt of the TCP SYN message by transferring a TCP SYN-ACK message back to client system 351 at step 2. Client system 351 then acknowledges the TCP SYN-ACK message at step 3 by sending a TCP ACK message to virtual edge system 301. Steps 1-3 of scenario 600 therefore complete a three-step TCP handshake establishing a TCP connection between client system 351 and virtual edge system 301.

Connection state information 602 is generated by virtual edge system 301 to include information describing the newly established connection. In this example, connection state information 602 includes the source port XX, the destination port YY, and the IP address of client system 351. Connection state information 602 is stored in virtual edge system 301's state information base, passed to virtual edge systems 302 and 303, and stored in the respective state information bases of virtual edge systems 302 and 303 in accordance with steps 2-6 of scenario 500 discussed above. Unlike scenario 500, where virtual edge systems 301-303 can all start receiving traffic at step 7 for the connection with client system 351 upon updating their respective state information bases, scenario 600 performs additional steps 4-5.

Specifically, at step 4 each of virtual edge systems 302 and 303 initiates a three-step TCP handshake by transferring a TCP SYN message with the source port being YY and the destination port being XX, as virtual edge systems 302 and 303 are the sources of these subsequent handshakes and client system 351 is the destination. Client system 351 responds to those TCP SYN messages by transferring a TCP SYN-ACK message back to each of virtual edge systems 302 and 303 at step 5, which in turn transfer TCP ACK messages to client system 351 in response at step 6 to complete the three-step TCP handshakes. Client system 351 now has separate TCP connections to each of virtual edge systems 301-303.

Each of the level 3 and level 4 combinations for the three connections are unique after the handshakes are performed. In particular, the level 3 IP addresses for each of virtual edge systems 301-303 are different, which makes the level 3 component of the connections different in at least that manner. However, once level 3 packet communications are de-capsulated by client system 351 for each of the connections, the level 4 characteristics of the communications on each connection will indicate the same TCP socket since they each use the same ports XX and YY. Thus, when packet communications are transferred through any of virtual edge systems 301-303 to client system 351, akin to that shown in step 7 of scenario 500, client system 351 will associate the communications with the same TCP connection due to the communications having the same socket.

Figure 7:
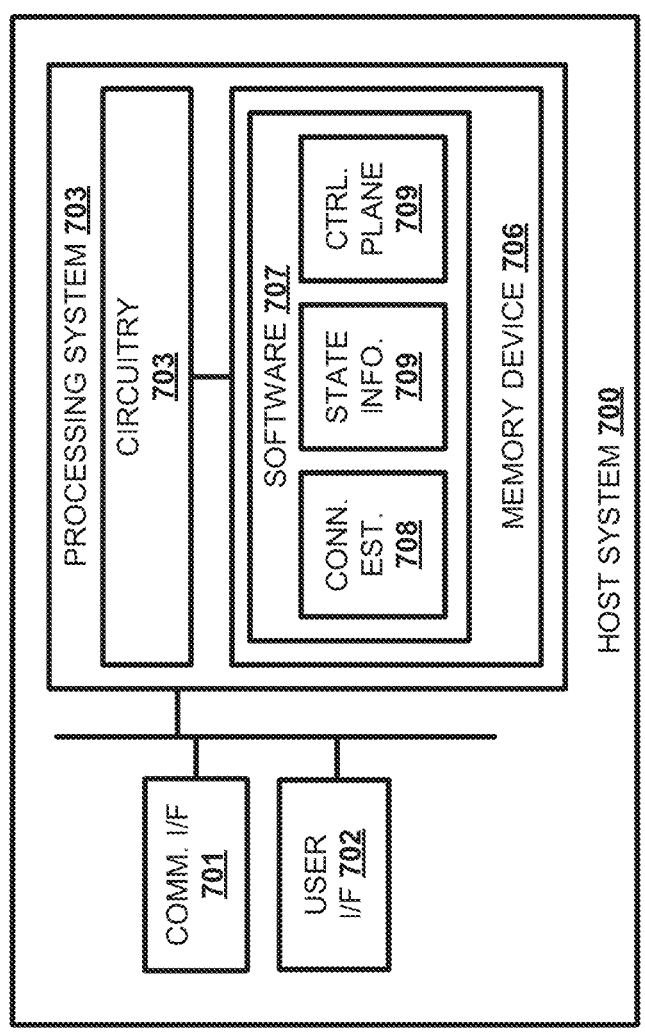
FIG. 7 illustrates a computing architecture used to enable multi-path routing in virtual edge systems according to one implementation.

FIG. 7 illustrates a computing system 700 to enable multi-path routing in virtual edge systems. Computing system 700 is representative of any computing system or systems with which the various operational architectures, processes, scenarios, and sequences disclosed herein enable multi-path routing in virtual edge systems. Computing system 700 is an example of a computing system for implementing virtual edge systems 101.1-N or virtual edge systems 301-304, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes connection establishment module 708, state information module 709, and control plane module 709, although any number of software modules within the application may provide the same operation. Operating software 707 may further include an operating system, utilities, drivers, network interfaces, applications, or some other type of software. When executed by processing circuitry 705, operating software 707 directs processing system 703 to operate computing system 700 as described herein.

In a particular example, modules 708-709 comprise a first virtual edge system of a plurality of virtual edge systems. Connection establishment module 708 directs processing system 703 to establish a connection for a communication with a client outside of a virtual network environment through the first virtual edge system. State information module 709 directs processing system 703 to generate state information about the connection that indicates properties of the connection with respect to the first virtual edge system and to update a state information base of the first virtual edge system with the state information. Control plane module 709 directs processing system 703 to transfer the state information to one or more other virtual edge systems of the plurality of virtual edge systems. The state information modules of those one or more other virtual edge systems then update their respective state information bases with the state information.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of enabling multi-path routing in stateful services of a virtual network environment, the method comprising:
   establishing a first connection between a first edge and a client, wherein the first edge provides a first stateful service of a plurality of stateful services and wherein the first edge regulates communication traffic going into and coming out of the virtual network environment;
   after generating state information about the connection, transferring the state information to a second edge that provides the stateful service;
   in the second edge, using the state information to initiate establishment of a second connection with the client; and
   routing traffic for a communication to the client through the first edge and the second edge over the first connection and the second connection.

2. The method of claim 1, wherein the state information includes a source port, a destination port, and a network address of the client.

3. The method of claim 1, wherein the first connection and the second connection are established for a communication with a destination within the virtual network environment, wherein the destination comprises a virtual application server, and wherein routing the traffic is performed by a virtual router.

4. The method of claim 1, wherein using the state information to initiate the establishment of the second connection comprises:
   using the state information to initiate a handshake between the second edge and the client.

5. The method of claim 1, wherein the first connection and the second connection comprise Transmission Control Protocol (TCP) connections.

6. The method of claim 5, wherein establishing the first connection comprises, in the first edge:
   receiving a TCP synchronize (SYN) message from the client that indicates a source port and a destination port, wherein the source port and the destination port are included in the state information;
   responding to the TCP SYN message with a TCP SYN-acknowledge (ACK) message; and
   receiving a TCP ACK message from the client in response to the TCP SYN-ACK message.

7. The method of claim 1, wherein transferring the state information comprises:
   transferring the state information to a controller of a plurality of edges including the first edge and the second edge;
   in the controller, identifying the second edge from the plurality of edges as an edge configured for multi-path routing; and
   transferring the state information from the controller to the second edge.

8. The method of claim 7, wherein the state information is transferred over a control plane channel employed by the controller and the first and second edges.

9. The method of claim 1, wherein the traffic comprises packets transferred from a destination within the virtual network environment in response to a request received from the client over the first connection.

10. The method of claim 1, wherein the first edge and the second edge comprise respective firewalls that identify the traffic from the state information and allow the traffic to pass.

11. A system hosting a first edge system of a plurality of edge systems of a virtual network environment to enable multi-path routing, the system comprising:
    one or more computer readable storage media;
    a processing system operatively coupled with the one or more computer readable storage media; and
    program instructions stored on the one or more computer readable storage media that, when read and executed by the processing system, direct the processing system to:
    establish a first connection between a first edge and a client, wherein the first edge provides a first stateful service of a plurality of stateful services and wherein the first edge regulates communication traffic going into and coming out of the virtual network environment;
    after state information about the connection is generated, transfer the state information to a second edge that provides the stateful service, wherein the second edge uses the state information to initiate establishment of a second connection with the client; and route traffic for a communication to the client through the first edge over the first connection, wherein the traffic is also routed through the second edge over the second connection.

12. The system of claim 11, wherein the state information includes a source port, a destination port, and a network address of the client.

13. The system of claim 11, wherein the first connection and the second connection are established for a communication with a destination within the virtual network environment, wherein the destination comprises a virtual application server, and wherein routing the traffic is performed by a virtual router.

14. The system of claim 11, wherein to use the state information to initiate the establishment of the second connection, the second edge:

uses the state information to initiate a handshake between the second edge and the client.

15. The system of claim 11, wherein the first connection and the second connection comprise Transmission Control Protocol (TCP) connections.

16. The system of claim 15, wherein to establish the first connection the program instructions direct the processing system to:

receive a TCP synchronize (SYN) message from the client that indicates a source port and a destination port, wherein the source port and the destination port are included in the state information;

respond to the TCP SYN message with a TCP SYN-acknowledge (ACK) message; and receive a TCP ACK message from the client in response to the TCP SYN-ACK message.

17. The system of claim 11, wherein to transfer the state information the program instructions direct the processing system to:

transfer the state information to a controller of a plurality of edges including the first edge and the second edge; and wherein the controller identifies the second edge from the plurality of edges as an edge configured for multi-path routing and transfers the state information from the controller to the second edge.

18. The system of claim 17, wherein the state information is transferred over a control plane channel employed by the controller and the first and second edges.

19. The system of claim 11, wherein the traffic comprises packets transferred from a destination within the virtual network environment in response to a request received from the client over the first connection.

20. The system of claim 11, wherein the first edge and the second edge include respective firewalls that identify the traffic from the state information and allow the traffic to pass.

* * * * *